May 13, 1958  K. M. HALEY ET AL  2,834,043
APPARATUS FOR MAKING PELLETS
Filed Aug. 5, 1954  3 Sheets-Sheet 1

INVENTORS
Kenneth M. Haley
Harold V. Trask
William C. Larter
BY
Hudson, Boughton,
Williams, Davis & Hoffmann
Attorneys May 13, 1958   K. M. HALEY ET AL   2,834,043
APPARATUS FOR MAKING PELLETS
Filed Aug. 5, 1954   3 Sheets-Sheet 2

INVENTORS
Kenneth M. Haley
Harold V. Trask
BY William C. Larter

Hudson, Boughton,
Williams, Davids Hoffmann
Attorneys

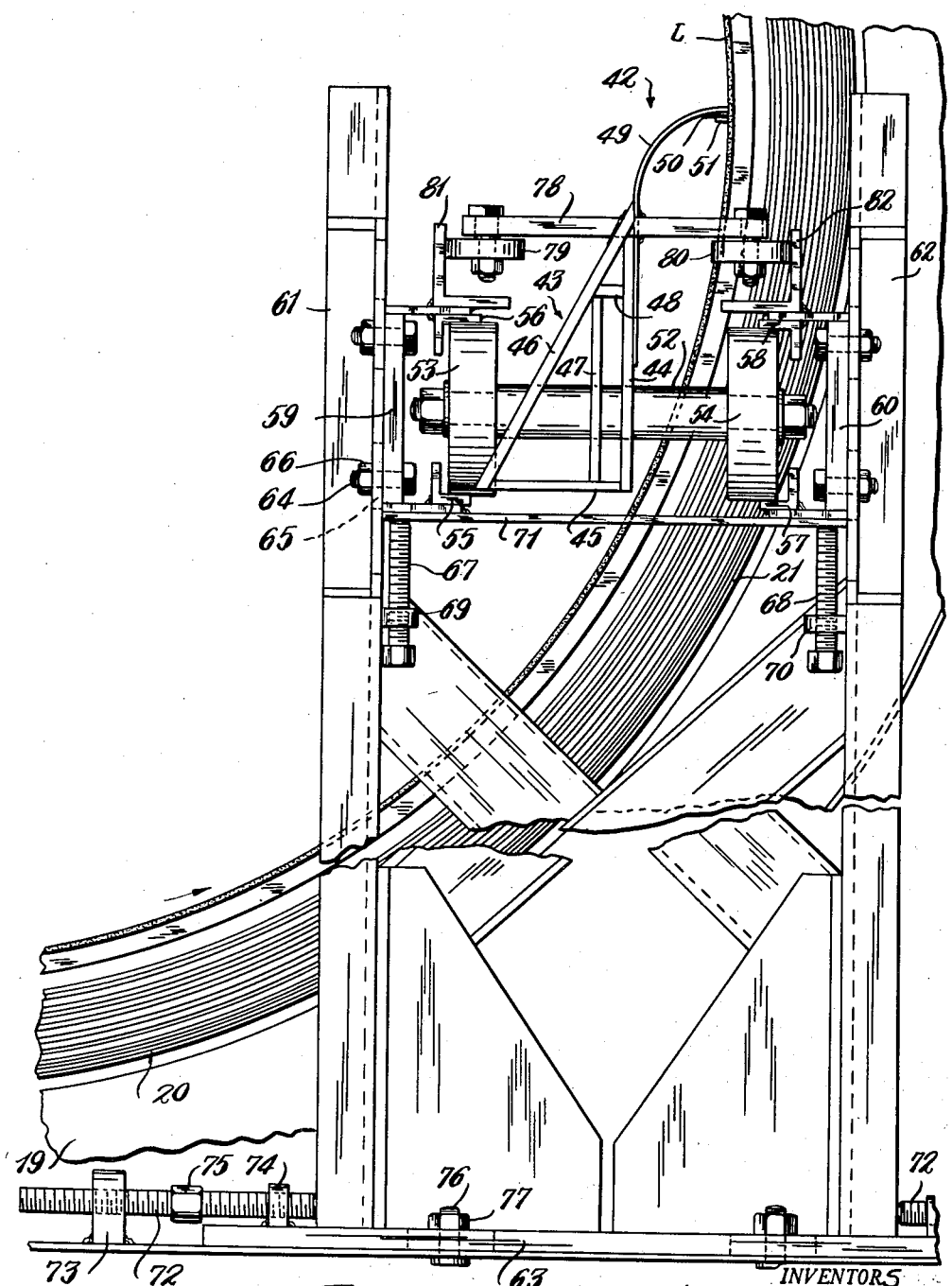

United States Patent Office 2,834,043
Patented May 13, 1958

2,834,043

APPARATUS FOR MAKING PELLETS

Kenneth M. Haley, Babbitt, Minn., Harold V. Trask, Shaker Heights, Ohio, and William C. Larter, Ashland, Ky., assignors to Oglebay, Norton and Company, Cleveland, Ohio, a corporation of Delaware Application August 5, 1954, Serial No. 448,073

5 Claims. (Cl. 18—1)

This invention relates to an apparatus for making pellets and, more particularly, to an apparatus for forming substantially spherical bodies or pellets from finely divided material.

This application is a continuation-in-part of our copending application, Serial No. 261,048, filed December 11, 1951, entitled, "Apparatus for Making Pellets."

Many materials such as ores, ore concentrates, flue dust, and the like, which are in finely divided state, require agglomeration into particles or bodies of larger size to facilitate handling and utilization. One commonly employed mode of effecting this agglomeration is performed by introducing the finely divided material into a rotating hollow cylinder or drum so that the material forms into substantially spherical pellets or balls by rolling and tumbling therein. An operation of this nature requires that the material, especially material such as ore concentrates, be in moistened condition and hence such materials tend to adhere to the interior wall of the cylinder or drum, forming a layer or cake thereon. Portions of this layer then drop off from time to time during the rotation and roll or tumble about upon the portions of the layer still adhering to the drum, thus forming the said pellets or balls. It has been found, however, that when this action is allowed to freely occur, the resulting bodies or pellets are extremely irregular in size and degree of compactness so that they are generally unsatisfactory. In an effort to overcome this defect, scrapers of various types have been proposed and employed upon the layer of material within the hollow drum or cylinder, but these scrapers have not heretofore proved entirely satisfactory.

Problems have also been encountered in the supplying of the finely divided material to such balling drums or cylinders. Thus, large scale operations require that the material delivery be substantially continuous and hence conveyors of various types have been employed, endless belt conveyors being preferred since they do not compact the material during the transportation thereof. In order to properly deposit the material in the cylinder or drum from such conveyors, however, it has been necessary heretofore to either employ chutes or to place the head pulley for the conveyor within the entrance end of the drum. The use of a chute is generally undesirable because of the tendency of the material to adhere thereto. Likewise, placing the head pulley of a belt conveyor within the drum is undesirable since this subjects the pulley and its bearings to the material scraped and dropping from the inner wall of the drum. This material, being extremely fine, easily penetrates conventional bearing seals and also tends to build up on the head pulley, thus causing frequent and expensive maintenance as well as generally unsatisfactory operation.

The product from balling cylinders or drums, of the type mentioned, generally includes some fines and also balls or pellets of improper size which should be removed from the balls or pellets of the desired size. Various stationary and rotary screens or trommels have been employed for this purpose, the latter generally being preferred. However, conventional rotating screens or trommelts frequently permit the balls or pellets to wedge therein, thus causing excessive pellet breakage, preventing proper screening action, and impeding discharge.

An object of this invention, therefore, is to provide an improved apparatus, for forming substantially spherical pellets or bodies from finely divided material, such that the aforementioned difficulties are eliminated, or greatly reduced, and the product therefrom is of generally uniform size, uniform compactness, free from fines, and generally of superior quality.

Another object of the invention is to provide an improved apparatus for forming substantially spherical bodies or pellets from finely divided material, which apparatus employs a rotating open-ended drum and is characterized by the provision of an improved scraping means for regulating the thickness and roughness of the surface of the layer of material adhering to the inner wall of the drum.

A further object of the invention is to provide an improved apparatus as defined in the preceding paragraph and wherein means are provided to reciprocate the said scraping means in a direction parallel with the axis of said drum.

A more specific object of the invention is to provide an improved apparatus as defined above and in which the scraping means comprises spaced members extending generally radially relative to the inner wall of the drum and provided with spaced projections of abrasion resistant material which engage the layer of finely divided material on the inner wall of the drum.

A still more specific object of the invention is to provide an improved apparatus as defined above, wherein the spaced members of the scraping means are individually resiliently supported on a common member which is repeatedly reciprocated longitudinally of the drum.

The invention also has as an object thereof the provision of an improved conveyor means for introducing the finely divided material into the interior of a hollow cylinder or drum, the said conveying means being so arranged and operated that it is not subject to the deleterious action of the material falling from the wall of the drum adjacent the entrance thereto.

A still further object of the invention is the provision of an improved apparatus for forming substantially spherical pellets or bodies from finely divided material by rotating the material in an open-ended drum, the discharge end of which communicates with a rotating screening means such that the fines and bodies smaller than a preselected size are removed and bodies of desired size pass thereover without clogging of the screening means or interference with discharge from the drum.

The invention further resides in certain novel features of the construction and in the combination and arrangements of parts of the apparatus in which the invention is embodied, and further objects and advantages of the invention will be apparent to those skilled in the art to which the invention pertains from the following description of the present preferred embodiment thereof, described with reference to the accompanying drawings in which:

Fig. 4 is an enlarged view of a portion of Fig. 2 showing the constructional details of the scraping means and of the supports therefor.

Figure 1:
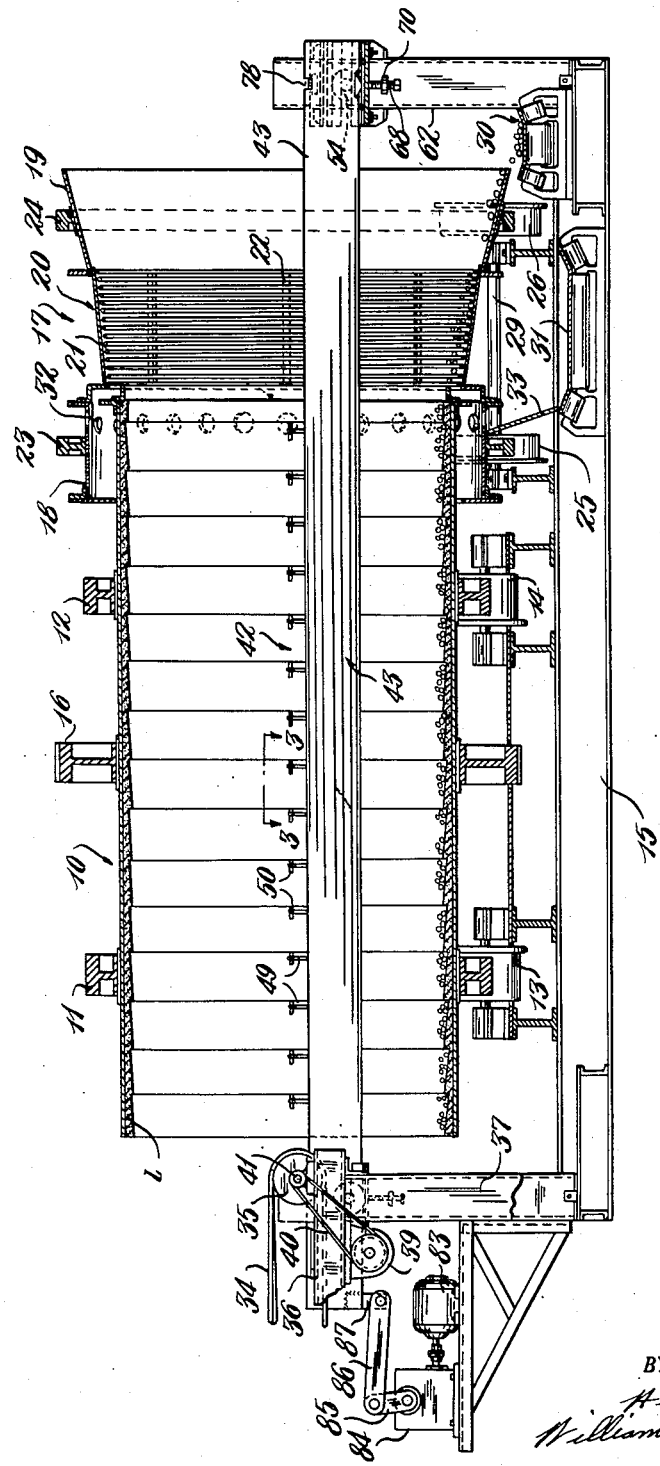
Fig. 1 is a longitudinal sectional view through the hollow cylinder or open-ended drum of the apparatus, embodying the present preferred form of the invention, with certain parts broken away and others shown in elevation.
Figure 2:
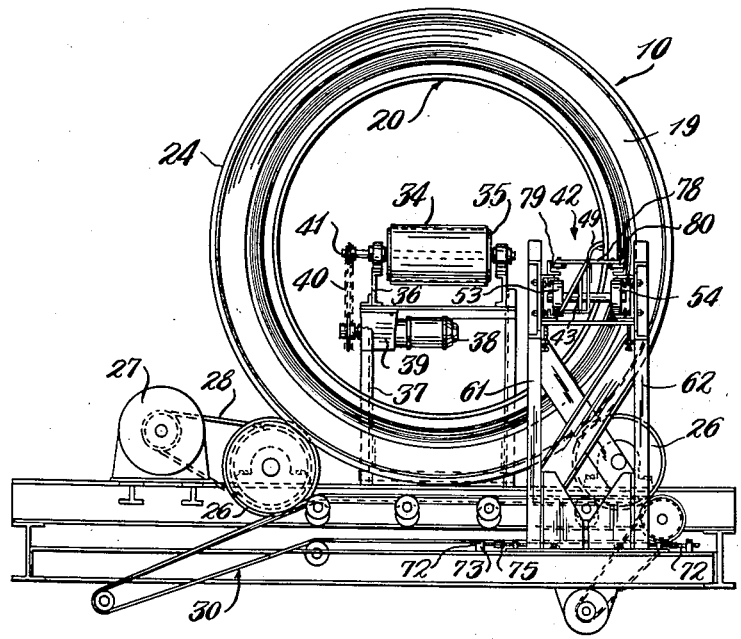
Fig. 2 is an elevational view of the discharge end of the apparatus as seen from the right-hand side of Fig. 1.

Referring first to Figs. 1 and 2 of the drawings, it will be seen that the illustrated apparatus, embodying the invention, comprises an elongated hollow cylinder or open-ended drum 10 formed of metal and having spaced circular tracks or rails 11 and 12 secured thereto. These rails are rotatably supported upon spaced pairs of flanged wheels 13 and 14 which are journalled in suitable bearings mounted upon a structural steel frame or base 15. The axis of the cylinder or drum 10 is here shown as extending substantially horizontally, but it is actually inclined slightly downwardly to the right as viewed in Fig. 1, the angle of inclination being variable by changing the angle of the frame or base 15. This feature is well known in the art and hence the details thereof are not here illustrated and described. The drum is rotated by power means, such as an electric motor or the like not shown, which drives the bull gear 16 on the drum 10 through suitable reduction gears.

The discharge end of the drum 10 extends into a screening means or trommel, generally designated 17, without contact therewith. This screening means comprises a cylindrical portion 18 connected with a frusto-conical impervious portion 19 by a frusto-conical screen or trommel section 20. The screen or trommel section 20 is formed of a plurality of spaced concentric members or rings 21, each in the form of a closed ring with the plane thereof perpendicular to the axis of the drum. These rings are preferably formed of rods which are circular in cross section and are made from a material, or coated with a substance, to which the finely divided material being agglomerated does not readily adhere. For example, where the finely divided material is iron ore concentrate, the rods comprising the ring members 21 may be formed of, or be covered with, stainless steel. The frusto-conical portion or section 19 is also preferably formed of, or covered with, a material such as stainless steel to which the finely divided material does not adhere. The rings or members 21 are united to each other and to the portions or sections 18 and 19 by rods or bars 22 extending transversely over the outer surfaces of the rings and welded or brazed thereto.

The portions or sections 18 and 19 of the screening means 17 are each provided with circular tracks or rails 23 and 24, respectively, which are rotatably supported upon spaced pairs of flanged wheels 25 and 26, respectively. The screening means 17 is adapted to be rotated independently of the drum or cylinder 10 and preferably at a different speed than the speed of the said drum or cylinder. This rotation of the screening means may be effected, in the manner shown in Fig. 2, by means of a variable speed motor 27 and a speed reduction unit operatively connected by a sprocket and chain drive 28 to one of the wheels 26, the latter being connected through an axle 29 with the wheel 25 that is aligned therewith.

Adjacent the forward or discharge end of the frusto-conical portion 19 of the screening means 17 is located a conveyor 30 which is adapted to receive the pellets or bodies formed in the drum or cylinder 10 and passing over the screening means. This conveyor 30 forms no part of this invention and hence is not here illustrated in detail. Pellets or fragments thereof having sizes less than the spacing between the rings 21 of the screening means, as well as any of the unagglomerated fine material passing from the end of the drum 10, drop between the rings 21 onto a conveyor 31 and may be carried thereby either back to the entrance to the drum or to a point of storage, as may be desired. Any material passing between the end of the drum 10 and the screening means 17, thus entering into the portion or section 18 of the latter, is discharged therefrom through spaced openings 32 and this material is directed onto the conveyor 31 by a chute or guide 33, see Fig. 1.

The spacing between the rings 21 of the screening means 17 is preferably non-uniform, the greatest spacing being adjacent the end of the drum 10 while the least spacing is adjacent the frusto-conical portion 19. Consequently, any undersize or broken pellets or bodies, together with any fine material, drop from the screening means adjacent the end of the drum 10, where the spacing between the rings 21 is greatest. Any pellets or bodies which do not thus drop through the openings between the rings move forwardly over the more closely spaced rings adjacent the frusto-conical portion 19 and cannot lodge or wedge therein due to this reduced spacing, while at the same time any loose material clinging thereto may freely pass through the screening means to the conveyor 31. Consequently, the clogging of the screening means, which has heretofore been common, is avoided and the proper screening action is maintained. Moreover, the provision of the rings 21 as individual, complete, circular members rather than as a continuous helix or spiral insures that the screening means does not provide a component of motion to the pellets other than that due simply to their gravitation, so that the speed of discharge through the screening means is neither accelerated nor retarded in the manner which is characteristic of the action of helical or spiral screens.

The finely divided material which is to be agglomerated into the pellets or spherical bodies within the drum or cylinder 10 is transported from a source of supply by suitable conveying means, endless belt conveyors being preferable for this purpose since they do not compact the material during transportation as is the case when vibrating chutes or screw conveyors are employed. Heretofore, it has been common to place the forward or head end of the delivery conveyor within the entrance of the drum or cylinder 10 so as to insure that the material will be properly deposited therein. However, material dropping from the wall of the drum during its rotation cascades downwardly over the bearings for the head pulley of a conveyor thus positioned, thereby causing rapid deterioration of such bearings, since the material, being extremely fine, easily penetrates through conventional bearing seals. Also, this falling material tends to build up upon the underside of the conveyor belt between the latter and the head pulley, thus causing difficulties with respect to operation of the conveyor. These and like difficulties, which have required excessive maintenance and loss of time, are substantially eliminated in accordance with this invention, since the delivery conveyor is mounted with its forward or delivery end spaced externally of the entrance to the drum 10 so that the head pulley and its bearings are not subject to the material falling from the drum. Thus, as shown in Figs. 1 and 2, the feeding or delivery conveyor 34 has the head pulley 35 thereof rotatably supported upon suitable structural members, such as 36, 37 in alignment with the entrance to drum or cylinder 10, but spaced rearwardly therefrom. This conveyor is driven by a suitable variable speed motor 38 and speed reduction unit 39 connected by a chain and sprocket drive 40 to the axle 41 for the head pulley of the conveyor, the speed of rotation of the head pulley being such that the material carried thereon does not simply drop from the end thereof but is projected through a trajectory such that it falls entirely within the drum 10 and far enough from the feed or entrance end so that it is easily picked up and spread therethrough by the drum rotation.

The interior surface of the drum or cylinder 10 is such that the finely divided material supplied thereto tends to adhere to the drum and form a layer L thereon. For this purpose the inner surface of the drum may be provided with grooves having small burrs or other protuberances projecting therefrom as is now well-known in the art. Such a drum without other expedients, however, does not generally produce satisfactory pellets or balls, since the thickness of the layer of material adhering thereto is not uniform and large portions of that layer may break off as discrete lumps which are then rolled into bodies of many times the desired size. Also, in some instances it has been found that the formation of balls or pellets is hindered by the surface of the layer becoming relatively hard and smooth so that the loose material or particles tend to slide thereon rather than roll. In order to maintain the drum lining of proper thickness and surface roughness, the apparatus of this invention comprises a scraping means, generally designated 42, which has spaced members extending into radial engagement with the surface of the material layer L in the drum and which are reciprocated longitudinally of the drum during rotation of the latter.

In the illustrated embodiment, the scraping means 42 comprises a common supporting member 43, which is an elongated structure of generally triangular configuration in cross section, formed of welded steel plates or the like. As will be apparent from Fig. 4, this member 43 has a vertically extending portion or leg 44, a base plate 45, and a hypotenuse 46 which are suitably connected together and are additionally strengthened by reinforcing plates 47 and 48. The triangular configuration of the supporting member 43 has been selected to prevent the building up of material scraped from the drum upon the top surface of the supporting member as would be the case if the upper portion of the latter had substantial width. To further prevent this building up of the scraped material upon the supporting member, the latter may be formed of stainless steel or covered or coated with that or other substances to which the finely divided material does not readily adhere.

Figure 3:
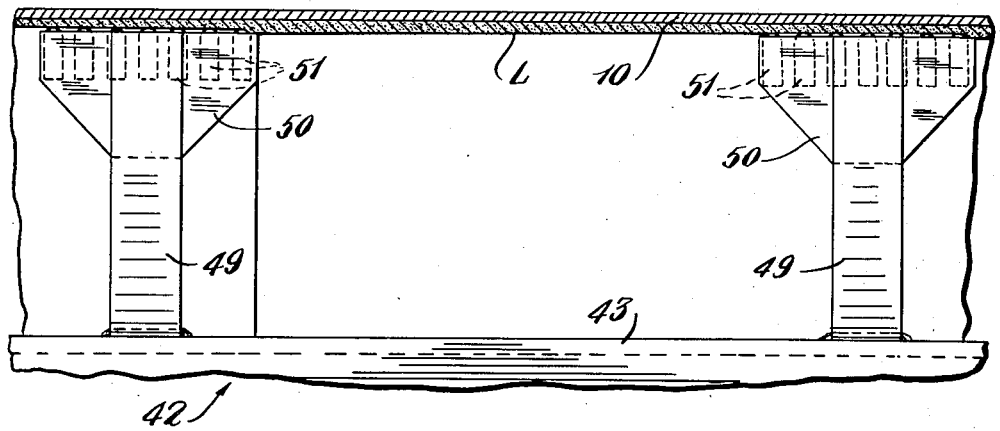
Fig. 3 is an enlarged, fragmentary view of a portion of the scraping means, the view being taken substantially on the line 3—3 of Fig. 1.

Connected to the vertical portion or leg 44 of the supporting member 43, at longitudinally spaced points therealong, are members 49 which are preferably flexible, as, for example, strips of spring steel or the like, thereby reducing the variable shock load transmitted to the member or bar 43 while maintaining the tip portions thereof in contact with the coating upon the inner wall of the cylinder. These members 49 have an arcuate portion so that the outer, unsupported ends of the members extend generally radially with respect to the drum and on this outer, unsupported end of each of the members 49 is mounted a plate-like member 50 having a width greater than the width of the member 49. The edge of each of the plate-like members 50 adjacent the wall of the drum or cylinder 10 is provided with a series of spaced projections 51 which are formed of abrasion resisting material considerably harder than the finely divided material being balled within the drum. In the preferred embodiment, these projections 51 are substantially finger-like members of tungsten carbide welded or otherwise secured to the under-surface of the plates 50 so that the outer ends of the members 51 project therefrom slightly as will be seen in Fig. 3.

The scraping means 42 is movably supported adjacent the inner wall of the drum with the plate-like members 50 and their projections 51 substantially in the horizontal plane of the center line of the drum as will be clearly seen from Figs. 1, 2 and 4. This support of the scraping means is effected by providing an axle, such as 52, adjacent each end of the member 43 exteriorly of the ends of the drum 10 and screening means 17. These axles 52 are each provided with a pair of spaced wheels 53 and 54 which are rotatable upon short longitudinally extending tracks 55, 56 and 57, 58, respectively. The tracks 55 and 56 are welded or otherwise connected to a vertically extending plate 59 while the tracks 57 and 58 are welded or otherwise connected to a vertically extending plate 60. The plates 59 and 60 are vertically adjustably carried upon spaced, vertical standards or supports 61 and 62, respectively, which extend upwardly from a suitable base plate or member 63. This connection of the plates 59 and 60 to the standards 61 and 62 is effected by bolts such as 64 extending through holes in the said plates and vertically extending slots, such as 65, in the standards so that when the nuts 66 for the bolts are loosened, the plates 59 and 60 may be vertically moved, thereby correspondingly altering the elevation of the scraping means. The desired adjustment of the scraping means in this direction is readily effected, when the said nuts 66 are loosened, by operation of adjusting screws 67 and 68 which are threaded through stationary nuts, such as 69 and 70, welded to the standards 61 and 62, the adjusting screws having their ends abutting a connecting plate 71 extending between the plates 59 and 60.

The scraping means 42 may be adjusted in a horizontal direction by adjusting screws such as 72 threaded through stationary nuts, such as 73, welded to the bed or frame on which the drum or cylinder 10 is supported, with the said screws passing through guides 74, provided on the base plate 63 for the scraping means, and bearing against the vertical standards 61 and 62 thereof. The adjusting screws 72 are preferably each provided with a polygonal portion 75 to which a wrench or other tool may be applied for effecting rotation thereof. It will be evident, therefore, that, by operation of the adjusting screws 72, the horiozntal position of the scraping means 43 may be altered with respect to the axis of the drum or cylinder 10. The scraping means is preferably retained in its adjusted position by clamping bolts 76 which extend through slotted openings in the base plate 63 and holes in the supporting floor or frame, the bolts being provided with nuts 77 as shown in Fig. 4.

From the construction just described, it will be apparent that the scraping means 42 is supported for movement longitudinally relative to the drum and that the points at which the projections 51 engage the layer of material L within the drum can be adjusted by operation of the screws 67, 68 and 72, thus regulating the thickness of the said layer L. In addition to the previously described features of the supporting structure for the scraping means, it will be further noted that provision is made for guiding the said scraping means 42 in its longitudinal movement so that it travels in a straight line. For this purpose, the supporting member 43 is provided, adjacent its ends, with transversely extending members 78 the outer ends of which rotatably support wheels 79 and 80 with their axes extending vertically. These wheels 79, 80 ride upon vertical surfaces of horizontally extending rails 81 and 82, thus preventing transverse movement of the scraping means during its longitudinal travel.

The supports for the scraping means 42 are the same at both ends of the apparatus and hence only one has been illustrated and described in detail. It should be noted, however, that both of these supporting means are located exteriorly of the drum 10 and of the screening means 17 so that the aforementioned rails, such as 55, 56, 57, 58, 81 and 82, are located entirely externally of the drum and of the screening means and therefore are not subjected to clogging by the material being agglomerated.

Reciprocation of the scraping means 42 may be effected in any desired manner, but in the preferred embodiment this mechanism is shown as comprising an electric motor 83 driving a speed reduction unit 84 with the output shaft of the latter connected to a crank arm 85. The outer end of the crank arm 85 is operatively connected with the supporting member 43 of the scraping means through a link 86 which is pivoted to the crank arm 85 and to a lug 87 connected with the supporting member 43. The construction is such that, when the motor 83 is energized, the rotation of the crank arm 85 causes the link 86 to reciprocate the scraping means in a straight line, it being remembered that the latter is constrained to such movement by the wheels 53, 54, 79 and 80 and the cooperating rails 55—58 and 81, 82. This reciprocating movement of the scraping means is in proper timed relationship to the speed of rotation of the balling drum or cylinder 10 so that the projections 51 continuously scrape the layer L of material therein in a manner similar to a boring operation thus maintaining the layer at substantially a uniform thickness and degree of surface roughness so that large portions thereof do not break away from the surface of the drum. The action is such that the material of the layer L is continuously shredded or scraped therefrom to roll and tumble upon the retained layer due to the controlled roughened surface of the latter, thus forming the aforementioned substantially spherical balls or pellets, the quantity of material in the drum being kept substantially constant by discharge of the formed pellets and the continuous introduction of fresh material.

The action of the scrapers upon the layer of material L has been shown in somewhat exaggerated form in Fig. 1, from which it will be seen that, when the scraping members are at one end of their reciprocal movement, the thickness of the material in the layer L on the interior wall of the drum is at a minimum in the region of the said projections 51, while the thickness of this layer increases somewhat between the adjacent scraping members due to the continued rotation of the drum and the continuous supply of material thereto. However, this increased thickness intermediate the spaced scrapers is continuously reduced as a result of the reciprocation of the scraping means so that it never varies greatly and the surface of the layer L is continuously maintained at the proper degree of roughness, thus insuring proper formation of pellets or balls.

In operating the apparatus, the supporting member 43 is initially adjusted so that the projections or individual scrapers 51 are located substantially in the horizontal plane containing the longitudinal axis of the drum 10 and spaced from the inner wall of the drum a distance equal to the desired thickness of the layer L of the finely divided material to be formed thereon, this adjustment being effected by operation of the adjusting screws 67, 68 and 72, the scraping means being thereafter clamped in its adjusted position by the clamping bolts, as will be readily apparent. The conveyors 30 and 31 are then placed in operation, and the drive for the drum 10 is initiated as well as the drive motor 27 for the screening means 17. The direction of rotation of the drum and screening means is preferably counterclockwise, as viewed in the drawings, and the speed of rotation of the screening means is preferably different than that of the drum 10. With the apparatus thus conditioned for operation, the conveyors 30, 31 and 34 are placed in operation and the motor 83 for reciprocation of the scraping means is also started.

The finely divided material is, therefore, delivered to the drum 10 by the conveyor 34 and is thrown therein in a manner such that the material is distributed within the drum and forms a layer L thereon. Normally, the material will be sufficiently moist to effect proper adherence to the drum, but in the event additional moisture is necessary, spray tubes may be provided within the drum as is well known in the art. The drum 10 will preferably be inclined slightly from the horizontal so as to slope downwardly towards the conveyors 30 and 31, thus facilitating the distribution of the material within the drum and delivery of the pellets or balls therefrom at the desired rate. As the drum continues to rotate, the material in the layer L increases in thickness until it is contacted by the projections 51 of the scraping means and thereafter the thickness of this layer L is maintained substantially constant by the said scraping means which is continuously reciprocated at a slow rate during operation of the drum. Hence, the surface of the layer L is continuously scraped and the loose material tumbled and rolled therein rebuilding the layer and forming substantially spherical pellets or balls, the latter gravitating towards the screening means due to the rotation of the drum and the inclination thereof. By suitable selection of the speed of rotation of the drum and the angle of inclination thereof, the maximum diameter of the pellets or balls formed in the drum can be controlled to a desired value, while the minimum diameter is determined by the spacing between the rings of the screening means 17 over which the material discharged from the drum passes. Consequently, the pellets or balls passing over the rings 21 of the screening means onto the frusto-conically shaped portion 19 and thence onto the conveyor 30 are of a desired size range, while the smaller pellets and any discharged unagglomerated fines fall through the screening means onto the conveyor 31 by which they may be delivered to reprocessing apparatus and/or returned to the conveyor 34 for recirculation through the apparatus.

The dimensions of the apparatus here disclosed and the rates of speed of operation of the various parts thereof are, of course, determined in part by the type of material handled and in part by the rate of production desired. These can, of course, be readily determined by those skilled in the art, as can possible modifications and adaptations of the structures herein disclosed without, however, departing from the fundamental principles of the invention. Consequently, while a specific embodiment has been illustrated and described in considerable detail, it is to be understood that the invention is not limited to these details except as may be required by the spirit and scope of the appended claims.

Having thus described the invention, we claim:

1. An apparatus for forming substantially spherical bodies from finely divided material, the said apparatus comprising an open-ended drum, means to supply the material to the interior of said drum adjacent one end thereof, means mounting said cylinder to permit rotation thereof, a nonrotatable supporting member extending longitudinally through said drum in spaced relationship to the inner wall of the drum, means adjacent each end of said member supporting the latter exteriorly of said drum, means for reciprocating the said supporting member and a plurality of flexible scraper members supported on said longitudinally extending member in spaced relationship and extending transversely therefrom substantially at right angles to the axis of said drum into radial engagement with the layer of material adhering to the inner surface of said drum whereby the reciprocation of the supporting member as the cylinder is rotated moves the said scraper members progressively to ultimately engage the entire surface of the drum whereby the thickness and surface roughness of said layer are maintained substantialy constant and the material scraped therefrom is formed into the said substantially spherical bodies by rolling within said drum, the outer ends of said flexible scraper members being unsupported.

2. An apparatus for making pellets from finely divided material, the said apparatus comprising an open-ended drum, means to supply the material to the interior of said drum adjacent one end thereof, means mounting said cylinder to permit rotation thereof, a nonrotatable supporting member extending longitudinally through said drum adjacent to but in spaced relationship to the inner wall of the drum and supported at both ends thereof exteriorly of the drum, a plurality of spaced flexible members supported on said longitudinally extending member and extending transversely therefrom substantially at right angles to the axis of the drum and with the outer ends of said flexible members unsupported, means on the said unsupported outer ends of said flexible members engaging and scraping the layer of material adhering to the inner surface of said drum, and means to longitudinally reciprocate said supporting member while the said drum is rotating.

3. An apparatus for making pellets from finely divided material, the said apparatus comprising an open-ended drum, means to supply the material to the interior of said drum adjacent one end thereof, means mounting said cylinder to permit rotation thereof, a member extending longitudinally through said drum adjacent the inner surface thereof at one side of the center line of the drum, means exteriorly of said drum supporting said member for longitudinally reciprocating movement in a direction parallel with the axis of the drum, a plurality of spaced arcuate spring members each supported at one end on said member and extending transversely therefrom with the other ends unsupported and directed substantially radially towards the interior surface of said drum, a scraping means on the unsupported end of each of the said spring members engagaing the layer of material adhering to the inner surface of said drum, means connected with said supporting member for repeatedly reciprocating the latter axially with respect to the drum while the drum is rotating whereby the said scraping means is moved progressively into engagement with the entire inner surface of the drum thereby to maintain the thickness and the surface roughness of the layer of material on the interior of said drum substantially constant.

4. An apparatus for making pellets from finely divided material, the said apparatus comprising an open-ended drum, means to supply the material to the interior of said drum adjacent one end thereof, means mounting said cylinder to permit rotation thereof, an elongated supporting member substantially triangular in cross section extending longitudinally through said drum at one side of the center line thereof and with the apex of the member uppermost, means exteriorly of said drum supporting said member for longitudinally reciprocating movement in a direction parallel with the axis of the drum, a plurality of spaced arcuate spring members each supported at one end on said member and extending transversely therefrom with the other ends unsupported and directed substantially radially towards the interior surface of said drum, a separate scraping means on the unsupported end of each of the said spring members engaging and scraping the layer of material adhering to the inner surface of said drum, and means connected with said supporting member for repeatedly reciprocating the latter axially with respect to the drum while the drum is rotating, whereby the said scraping means moves to progressively engage the entire inner surface of the drum thereby to maintain the thickness and surface roughness of the layer of material on the interior of said drum substantially constant so that the loose material is formed into substantially spherical pellets by rolling within said drum.

5. An apparatus for forming substantially spherical bodies of predetermined size from finely divided material, the said apparatus comprising an open-ended drum, means for supplying the material into one end of said drum, means for rotating said drum thereby causing the material to adhere to the interior thereof in the form of a layer, means to engage and scrape said layer thereby causing some of the material to drop therefrom and be formed into substantially spherical bodies by rolling in the drum, and a rotating frusto-conical screen means at the other end of said drum receiving the bodies and loose material discharged from said drum, the said screen means comprising a plurality of spaced concentric members each in the form of a closed ring the plane of which is perpendicular to the axis of said drum, and means rigidly connecting said concentric members in spaced relationship with the spacing between those members adjacent said drum greater than that between those members remote from said drum.

References Cited in the file of this patent

UNITED STATES PATENTS

| | | |
|---|---|---|
| 1,994,718 | Lellep | Mar. 19, 1935 |
| 2,638,625 | Studebaker et al. | May 19, 1953 |